ns Patent [19]

United States Patent [19]

Hoppe et al.

[11] 4,093,605
[45] June 6, 1978

[54] AUXILIARY AGENT FOR IMPROVING RETENTION, DRAINAGE AND TREATMENT

[75] Inventors: Lutz Hoppe; Branislav Boehmer; Rudolf Behn, all of Walsrode, Germany

[73] Assignee: Wolff Walsrode Aktiengesellschaft, Walsrode, Germany

[21] Appl. No.: 650,966

[22] Filed: Jan. 21, 1976

[30] Foreign Application Priority Data

Jan. 24, 1975 Germany .............................. 2502874
Aug. 30, 1975 Germany .............................. 2538745

[51] Int. Cl.² ............................................... C08G 69/48
[52] U.S. Cl. ............................ 260/78 SC; 162/164 R; 210/54; 210/42 R; 260/29.2 EP; 260/29.2 N; 260/78 L
[58] Field of Search ............... 260/78 SC, 78 A, 78 L

[56] References Cited

U.S. PATENT DOCUMENTS 3,320,215  5/1967  Conte et al. ..................... 260/78 SC
3,632,559  1/1972  Matter et al. .................... 260/78 SC

*Primary Examiner*—Harold D. Anderson
*Attorney, Agent, or Firm*—Plumley and Tyner

[57] ABSTRACT

Auxiliary agent for improving the retention of flushable solids, the drainage of suspensions and the rapid treatment of industrial waters, effluents and sludges, especially in paper making which comprises the crosslinking of an intermediate product A with another intermediate product B in the presence of an polyfunctional compound to form the auxiliary agent C, wherein the intermediate product A comprises polyamines which contain quaternary nitrogen and which are formed by the action of polyvalent and/or monovalent amines on the reaction products of the secondary amine hydrochlorides with epichlorohydrin and wherein the intermediate product B comprises basic-polyamino-amides.

3 Claims, No Drawings

AUXILIARY AGENT FOR IMPROVING RETENTION, DRAINAGE AND TREATMENT

PRIOR ART

The invention relates to an auxiliary agent for improving the retention of flushable solids and for accelerating the drainage of suspensions and for more rapid treatment of industrial waters, effluents and sludges by adding suitable basic water-soluble polymers.

Polymers of this type and their use in the above-mentioned sense in papermaking are already known to the specialist. Thus, a condensation product of an aliphatic dicarboxylic acid with a polyalkylenepolyamine, which is subsequently reacted with epichlorohydrin, has been disclosed in British patent Specification No. 865.722. A molar ratio between secondary amino groups on the one hand and epichlorohydrin on the other hand in the range of 0.5 to 1.8:1 is claimed and dimethyl sulphate is indicated as the quaternising agent in almost all the examples. 25 to 75% to the tertiary amino groups are quaternised with methyl iodide. In the above-mentioned Patent Specification, these products have been proposed for improving the wet strength of papers. However, the products mentioned do not lead to an improvement in the drainage capacity and retention capacity in papermaking since the methyl side-groups exert no steric influence on the flocculation in the paper suspension.

A further auxiliary agent for the retention of fillers in papermaking is indicated in German Pat. Specification No. 1 211 922 (corresponding to British pat. No. 964,065), the products being used having been prepared by reacting 0.8 to 0.95 mol of epichlorohydrin or α-dichlorohydrin with one mol of a diamine or polyamine, the amino groups of which are separated by at least three carbon atoms, in a diluent, preferably in water. Since this retention agent contains no quaternary nitrogen in the polyalkylene polymer and accordingly has no cationic charges in the neutral range, the retention in this range is relatively low.

Further paper auxiliary agents based on polyamidepolyamine have been disclosed in British Pat. No. 1,035,296. They are obtained from reactions between polyamino-amides, which have been prepared from dicarboxylic acids and polyalkylenepolyamines, and epichlorohydrin. These products have several advantages and the storage stability may be mentioned inter alia. However, on the other hand, as a linear polyamino-amide they do not have any long amine side chains, which is why the retention and drainage capacity is not satisfactory.

The further auxiliary agent for the paper industry which has been disclosed in U.S. Patent Specification No. 3,320,215 is said to improve, in particular, the wet strength of papers made in this way. This is obtained by a polycondensation reaction of aminocarboxylic acids or their lactams with dicarboxylic acids and polyalkylenepolyamines and subsequent crosslinking of the product with epichlorohydrin. A disadvantage is that the macromolecule in this case also contains no long amine side chains and that when the compounds according to this U.S. Patent Specification are used in the field of retention agents and drainage agents, as is possible in principle, they are not able to exhibit an appropriately high capacity.

Furthermore, the use of basic polyamides to increase the retention of fillers and pigments in papermaking, to accelerate the drainage of raw paper pulp suspensions and to treat the effluents from paper machines by filtration, sedimentation and flotation by adding basic polyamides to the raw paper pulp suspensions and/or the effluents from paper machines has been disclosed in U.S. Pat. No. 3,632,559, corresponding to German Pat. No. 1,771,814, the basic polyamides used being water-soluble products of high molecular weight, which were obtained by the action of compounds, which are polyfunctional towards amino groups, on basic polyamides, which are dissolved or dispersed in water and were obtained from polyvalent amines, dicarboxylic acids, and aminocarboxylic acids, or their lactams, which contain at least three carbon atoms, less than 1 equivalent of reactive groups in the polyfunctional compounds per 1 equivalent of basic amino groups contained in the basic polyamides being used for the preparation thereof. Thus, in this case also the polyalkylenepolyamines are crosslinked with, for example, epichlorohydrin. Similarly to the compounds described in the abovementioned publications, the resulting acid product has a structure which, due to the lack of cationic side chains, does not produce an optimum retention and drainage capacity.

Finally, French Pat. Specification No. 2,094,645 discloses a state of the art in which a polyamide obtained from dimeric fatty acids and ethylenediamine is reacted with 2,3-epoxypropyltrimethylammonium chloride and the product is subsequently crosslinked with epichlorohydrin or formaldehyde. In itself, a product of this type can also be employed as a retention agent in papermaking but, because of the chemical macromolecular structure thus formed (that is to say due to the content of dimeric fatty acids) it contains relatively few polar groups and the retention capacity is therefore also not especially good. An inventive further development based on this state of the art resulting from the French Patent Specification has been published, in the form of an earlier application by the undersigned, as DT-OS (German Published) Specification) No. 2,353,430 and will be discussed further below.

However, the state of the art disclosed by Canadian Pat. Specification No. 934,892, which relates to a process for the preparation of polyalkylenepolyamine-polyamide resins and their use as wet strength agents, should be discussed first. This condensation product is formed from diesters of aliphatic dicarboxylic acids and polyalkylenepolyamines and, in contrast to the state of the art described there, it is said that there is no dark discoloration when corresponding condensation products of identical structure are crosslinked with epichlorohydrin. This product, which is intended to serve as a wet strength agent, is unstable in an alkaline medium because it contains more epichlorohydrin than is converted in the crosslinking reaction and it therefore has to be rendered acid. Apart from this disadvantage, it is to be feared that, because of the macromolecular structure evident from the above Patent Specification, due to the lack of basic long side chains, the retention and drainage capacity would not be particularly good if the product were used as a retention agent, which is possible in principle.

Another product, which has been disclosed in DT-OS (German Published Specification) No. 2,162,204, is also prepared from aliphatic dicarboxylic acids and polyalkylenepolyamines, which are crosslinked with epichlorohydrin and are used as anchoring agents on sheet-like structures of regenerated cellulose.

From the point of view of the macromolecular structure, a product of this type in principle is also suitable as a retention agent but practical experiments, which are not covered by the description in the above published specification, have shown that the retention and drainage capacity in papermaking is not especially good.

The description and claims of DT-OS (German Published Specification) No. 2,209,242, which was disclosed at a later date and goes back to an earlier patent application by the undersigned, are also fundamentally directed towards an anchoring agent, especially on sheet-like structures containing regenerated cellulose; in this case this water-soluble, heat-curable anchoring agent is obtained by polycondensation of a monomer mixture containing polyalkylenepolyamines, dicarboxylic acids and diamines and is crosslinked with epichlorohydrin and then used for anchoring. In principle, this product also can be used for retention and drainage and to improve flocculation in papermaking but, in this case also, with a structure which is not optimum for these purposes, only moderate retention and drainage capacities in papermaking can be expected.

Furthermore, a base-modified polyamide has been disclosed in U.S. Pat. No. 3,893,981, but this is not soluble in water and in the abovementioned patent application the range of use of this product has been restricted to that of a substrate for reactive dyestuffs. The insolubility of the product in water therefore makes it impossible to use it as a retention, drainage and/or treatment agent for sludges in papermaking.

Furthermore, although the use of monovalent amines as the monomer component also has already been disclosed in DT-OS (German Published Specification) No. 1 795 392, reaction products of, for example, dimethylamine and epichlorohydrin being used, these reaction products are always present as dichlorides. Due to this differing structure, these products are used as crosslinking agents in the known publication. This crosslinking agent then forms short bridges between two polyaminoamide molecules, so that only a few quaternary nitrogencontaining groups can be introduced into the crosslinked polyaminoamide molecule. If, on the other hand, the chain length of this crosslinking bridge were correspondingly increased in order to avoid this disadvantage, insolubility of the finished product, in its form as a retention agent, in the aqueous solvent would result and its corresponding applicability would thus disappear.

Finally, DT-OS (German Published Specification) 23 53 430 should be mentioned as the most recent state of the art to be quoted in this connection; this patent application is directed towards the preparation and use of water-soluble papermaking auxiliaries agent based on polyaminoamide and is, under certain circumstances, to be regarded as an inventive further development of the abovementioned French Patent Specification No. 2,094,645 in so far as, in the abovementioned DT-OS (German Published Specification) No. 23 53,430, in papermaking the dimeric fatty acids indicated in this earlier state of the art have been replaced, as a constituent of the starting monomer mixture for the preparation of a macromolecule having a retentive action, by side chains which are short but more cationic and which thus have a greater retentive action. Although this macromolecular compound according to the invention exhibits a substantially better retention capacity than almost all the products which have been disclosed in the state of the art mentioned previously, the retention, drainage and water treatment capacities which can be achieved with this product in papermaking are still not always completely satisfactory.

In addition to this problem, which is evident from the abovementioned defects, of either further improving the retention, drainage and water treatment capacity when, for example, employing the same amounts of retention agent, or alternatively, of achieving the same retention capacity whilst at the same time using considerably less substance, and thus being able to achieve a saving in the products having a retention action, a further problem which remains unresolved is that products of this type which are yet further improved should not, likewise wholly or partly lose the good properties, which some of the other abovementioned products also possessed. In this connection only the storage stability in a basic medium need be recalled which, for example, is necessary when the raw paper pulp suspension contains alkaline polyethyleneimine solutions. The later solutions frequently cause unstable retention agents to gel out in this basic medium, which, because of the drainage of the paper web, is no longer adequate, due to gelling, has a detrimental effect on a retention capacity, which is in itself desirable. Thus, an optimum retention agent must have a good storage stability even in a basic medium, coupled with an optimum retention and drainage capacity and must always be readily soluble in water, even in the crosslinked state.

OBJECT OF THE INVENTION

It is therefore an object of the invention to provide a suitable auxiliary agent which exhibits a substantially excellent retention capacity in connection with an improved drainage and water treatment capacity.

THE INVENTION

Accordingly this invention relates to an auxiliary agent for improving the retention of flushable solids and for accelerating the drainage of suspensions and for the rapid treatment of industrial waters, effluents and sludges, where this improvement, acceleration and treatment is achieved by adding suitable basic water-soluble polymers, whereby the abovementioned problem is solved when the auxiliary agent is a reaction product C, which has been prepared by crosslinking, as an initial intermediate product A, polyamines which contain quaternary nitrogen, product A having been formed by the action of monovalent and/or polyvalent amines on the reaction product of secondary amine hydrochlorides with epihalogenohydrin, with, as a second intermediate product B, known basic polyaminoamides, which are prepared from at least dicarboxylic acid, at least one polyalkylenepolyamine and/or least one aminocarboxylic acid or its lactam and/or hexamethylenediammoniumadipate, polyfunctional compounds being added.

Appropriately, the polyfunctional compound in the auxiliary agent according to the invention is an epichlorohydrin and/or a dihalogenoalkane.

Suitable amines for use in the preparation of the intermediate product A required for the preparation of the auxiliary agent according to the invention are monovalent primary amines, monovalent secondary amines, polyvalent primary amines or polyvalent secondary amines. Furthermore, it is likewise possible to employ, and to use, any desired mixtures of the abovementioned amines for producing the intermediate product A.

Auxiliary agents according to the invention which are particularly advantageous for use in the papermaking industry are obtained when compounds of the general formula $$R_3-NH_2$$

wherein $R_3$ is an alkyl radical of the formula $$C_xH_{2x+1}$$

and $x$ is 1 – 4, are used as monovalent primary amines.

By contrast, compounds of the general formula $$R_3-NH-R_4$$

wherein $R_3$ and $R_4$ are each alkyl radicals of the formula $$C_xH_{2x+1}$$

and $x$ is 1 – 4,
are advantageously used as monovalent secondary amines.

The auxiliary agents according to the invention can, however, also be prepared with the use of polyvalent primary amines and polyvalent secondary amines in just the same way as with the abovementioned monovalent primary alkylamines and monovalent secondary alkylamines. Above all, compounds of the general formula $$NH_2-R_5-NH_2$$

wherein $R_5$ is an alkyl radical of the formula $$C_xH_{2x}$$

and $x$ is 2 – 4,
are suitable as polyvalent primary amines.

Compounds of the general formula $$R_3-NH-R_5-NH-R_4$$

wherein $R_3$ and $R_4$ are each alkl radicals of the formula $$C_xH_{2x+1}$$

and wherein $R_x$ is an alkyl radical of the formula $$C_xH_{2x}$$

and $x$ is 2 – 4,
are advantageously used as polyvalent secondary amines.

It is likewise possible, within the scope of the invention, to employ polyvalent amines, which simultaneously contain primary and secondary amino groups in the molecule, in the abovementioned sense. In that case, those compounds which have the general formula $$H_2N-R_5-NH-R_5-NH-R_5)_n[NH_2]_u$$

wherein $R_5$ is an alkyl radical of the formula $$C_xH_{2x}$$

and $x$ is 2 – 4.
$n$ is 0 – 3 and
$u$ is 0 or 1,
are advantageously used.

It is particularly advantageous when the auxiliary agent in the form of the reaction product C according to the invention, has been prepared by crosslinking, an initial intermediate product A, in an amount of 0.5 to 3 mols (relative to polyalkylenepolyamine) of a polyamine containing quaternary nitrogen, whereby the product A has been formed by the action of 1 to 2 mols of an alkylamine on the reaction product of 1 mol of the secondary amine hydrochloride of the general formula

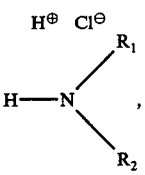

wherein $R_1$ and $R_2$ are identical or different alkyl radicals of the general formula $$C_xH_{2x+1}$$

wherein $x$ is 1 – 4, with 1 to 3 Mols of epichlorohydrin, with a second intermediate product B, in an amount of 0.5 – 3 mols (relative to polyalkylenepolyamine) of the basic polyaminoamide, by adding epichlorohydrin to the mixture of the aforementioned intermediate products A and B.

A particularly advantageous auxiliary agent results when a reaction product C is prepared by crosslinking 0.8 – 1.2 mols (relative to polyalkylenepolyamine of the intermediate product A which has been formed by the action of 1.1 – 1.5 mols of an alkylamine, selected from a group of alkylamines of the general formulae $$R_3-NH_2;\ R_3-NH-R_4;\ NH_2-{}_5-NH_2;$$

$$R_3-NH-R_5-NH-R_4;$$

$$H_2N-R_5-NH-R_5-NH-R_5)_n[NH_2]_u$$

wherein $R_3$ and $R_4$ are each alkyl radicals of the formula $$C_xH_{2x+1}$$

but $R_5$ is an alkyl radical of the formula $$C_xH_{2x}$$

$x$ is 2 – 4,
$n$ is 0 – 3 and
$u$ is 0/ or 1, on the reaction product of 1 mol of the secondary amine hydrochloride of the general formula

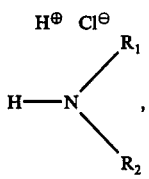

wherein $R_1$ and $R_2$ denote identical or different alkyl radicals of the general formula $C_xH_{2x+1}$,
wherein
  $x$ is 1 – 2, with 1.5 mols epichlorohydrin, with 0.8 – 1.2 mols (relative to polyalkylene-polyamine) of the second intermediate product B, by adding epichlorohydrin to the mixture of the aforementioned intermediate products A and B.

In a further development of the auxiliary agent, it is of advantage if the reaction product C in a 20% strength by weight aqueous solution at 25° C has a viscosity of 50 to 1,000 centipoise and has been formed from intermediate products A and B crosslinked by means of epichlorohydrin.

The abovementioned auxiliary agent can be used with particular advantage in the papermaking industry, but also in other branches of industry, which will be discussed in even more detail after the examples.

In order to provide those skilled in the art with guidance for technical action, with respect to the subject of the abovementioned invention, which is as careful, reproducible and accurate as possible, a more general representation of the procedure for preparing the agent is now first given, in addition to the synthesis of the auxiliary agent according to the invention, which has already been described, and this procedure is then defined precisely in the form of the examples according to the invention, which follow later, and the corresponding comparative examples.

Within the scope of this description of the process it is stated that an intermediate product A is first prepared from the hydrochloride of a secondary amine, epichlorohydrin and a further secondary or primary, monovalent or polyvalent amine. It is preferable that the intermediate product A is so strongly linked, by means of a bifunctional compound, to the intermediate product B, which is already known from the abovementioned state of the art, that ultimately a 20% strength by weight solution have a viscosity of 50 to 1,000 centipoise at 25° C is obtained. The intermediate product A is produced in two process steps by first converting the secondary amine, by means of acids, into the corresponding salt, for example into the hydrochloride, and then reacting this salt with twice the molar amount of epichlorohydrin. This intermediate compound is then generally reacted with 0.5 to 3 mols of a monovalent or polyvalent amine per mol of intermediate compound. The reaction preferably should be continued until 100% of the chlorine bonded to epichlorohydrin can be detected as chloride. It is surprising that prolongation of this reaction time results in a considerable increase in the viscosity; however this does not have a negative effect on the activity of the intermediate product A and the end product C. Thus, depending not only on the other conditions but also depending on the reaction time, the intermediate product A can have viscosities of 2,000 – 50,000 centipoise (measured in 70% strength by weight solutions at 25° C). This subsequent reaction, which is generally carried out for somewhat more than two hours at not more than 80° C, leads not only to an increase in viscosity, which is frequently desired, but also considerably reduces the amount of epichlorohydrin, or a comparably suitable other crosslinking agent, which is required to bond the intermediate product A with the intermediate product B to give the end product C. Despite this frequently significant and advantageous saving of epichlorohydrin, the properties of an end product C prepared using an intermediate product A which has been rendered more highly viscous by subsequent reaction are practically unchanged. This possibility for saving epichlorohydrin has also been taken into account and illustrated in the series of examples which follow.

In general, however, those skilled in the art can themselves determined, by simple preliminary experiments, the exact amount by which the epichlorohydrin for crosslinking A with B is reduced.

The preparation of the intermediate product A can be described by formulae in the following way:

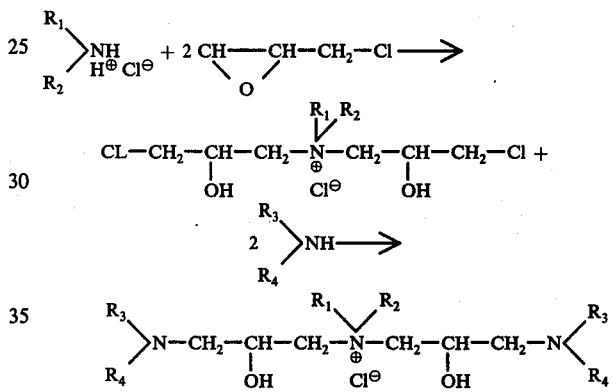

A secondary monovalent amine has been employed in the two reaction steps represented in the formulae given above. Preferably the reaction temperature is between 40 and 100° C. The intermediate product A, according to the invention, produced in the abovementioned manner is distinguished by a surprisingly low viscosity of the solution, namely a maximum of 100 centipoise at 25° C.

In the formulae indicated above, $R_1$ and $R_2$ represent identical or different alkyl radicals of the general formula $$C_xH_{2x+1}$$

wherein
  $x$ is 1 – 4.

$R_3$ and $R_4$ which also occur in the formula indicated above, can be hydrogen atoms or identical or different alkyl radicals of the general formula $$C_xH_{2x+1}$$

wherein
  $x$ is 1 – 4. The secondary amine hydrochloride represented intitially in the formula indicated above can be, for example, a dimethylamine hydrochloride, diethylamine hydrochloride or dipropylamine hydrochloride. Of course, a primary monovalent amine or corresponding polyvalent amines can also be employed in the form of the hydrochloride in place of the secondary monovalent amine indicated.

Furthermore, as can be seen from the formula indicated above, 2 mols of a primary or secondary amine, relative to the amine hydrochloride, are added after the action of 2 mols of epichlorohydrin on 1 mol of the secondary monovalent amine hydrochloride.

The intermediate product A thus obtained is combined with the commercially available intermediate product B, which has been prepared in the customary manner from at least one dicarboxylic acid, at least one polyalkylenepolyamine and at least one aminocarboxylic acid or its lactam and/or hexamethylenediammonium adipate, and the intermediate products are crosslinked with one another by adding polyfunctional compounds, such as epichlorohydrin and/or dihalogenoalkanes, it being possible for the following two types of fundamental reactions also to occur side by side:

1. The intermediate product A can be bonded directly to the intermediate product B;
2. The intermediate product A can be linked first with a further intermediate product A and this compound can then likewise be bonded to the intermediate product B.

Because of the abovementioned possibilities of variation within the scope of linking the intermediate product B to the intermediate product A according to the invention, the resulting structure of the macromolecular texture formed is branched and has linear cation-active side chains which favourably effect the process of drainage and of retention of the most diverse materials in the field of papermaking processes. Advantageously the intermediate product A and the intermediate product B in the end product C are in a molar ratio from 0.1 : 1 to 2 : 1, a range from 0.5 : 1 to 1.5 : 1 being particularly preferred as the molar ratio.

The monovalent and polyvalent amines mentioned in the abovementioned intermediate products A and B are partially employed in the form of their polyalkylenepolyamines, it being possible, of course, to employ, as the polyalkylenepolyamines not only diethylenetriamine and dipropylenetriamine but also, equally well, the higher homologues of the two polyalkylenepolyamines mentioned.

The reactions necessary to link the intermediate product A to the intermediate product B to give the end product C depend, of course, on the quantity of the added polyfunctional compound. Preferably only so much of this polyfunctional compound is added, that after an action time of 2 – 20 hours at a temperature from 40°– 100° C the end product C as a 20% strength by weight aqueous solution has a viscosity between 50 and 1,000 centipoise at 25° C. Most advantageously, the intermediate products A and B are reacted in ratios of 0.25 to 3 per 1 mol with 0.01 to 10 mols of epichlorohydrin per secondary amino groups, until the 20% strength by weight solution, already mentioned above, of the finished product C produced by the reaction with epichlorohydrin has the abovementioned viscosity at the temperature quoted.

As a result of incorporating the component according to the invention, in the form of the intermediate product A, into the end product C, the flocculation capacity and the acceleration of drainage as well as the retention of fillers by the finished auxiliary agent C are substantially higher than the corresponding capacities of known products.

After these more general notes about process technology, the subject of the invention will now be explained by reference to the processes of preparation which follow by way of examples.

The individual examples which now follow are divided into two large groups, the group I comprising the examples in which polyvalent amines are employed, whilst the group of examples II comprises the examples in which monovalent amines are used. The group of examples I follows now.

Within the scope of this group of examples I the first group of the examples given there refers to the preparation of the intermediate product A according to the invention (Table 1), the preparation of the commercially available intermediate product B (Table 2) and the preparation of the end product C according to the invention (Table 3). The performance of the auxiliary agent C according to the invention is then represented by means of further groups of examples, and in particular, Table 4 shows the acceleration of drainage, Table 5 shows the flocculation level and Table 6 shows the retention capacity for fillers, of the auxiliary agent according to the invention.

However, the subject of the invention which is illustrated by the examples which now follow is not restricted to the scope of these examples.

The data/figures quoted in all the examples for the chlorides, the amine number, the viscosity and the densities are always determined by the same appropriate method of determination:

1. Determination of chloride. This is carried out by the known titrimetric precipitation method according to F. Mohr. In order to prevent the possible formation of complexes of the silver ion with anions, which can interfere with the end point of the titration, the solution to be tested was acidified slightly with acetic acid.

2. Determination of the amine number. This was determined by titrating the aqueous solution of the abovementioned intermediate product B, 1 g of resin being dissolved in 100 ml of water, with 0.1 N hydrochloric acid using methyl red as the indicator. The mg of KOH which are equivalent to 1 g of pure resin are calculated from the hydrochloric acid consumed and these figures are given in the appropriate table of examples.

3. Determination of the viscosity. This has been indicated in the appropriate tables essentially for the abovementioned products B and C but in some individual cases also for the product A and was determined in a commercially available Höppler viscometer at 25° C using 20% strength by weight aqueous solutions of the appropriate products (ball No. 4).

4. Determination of the density. This was carried out by means of a commercially available densimeter at 20° C.

The methods of measurement used to test all the products listed in the examples under the same conditions to determine the technological properties of the product with a view to optimising the process according to the invention now follow and the results obtained are summarised in Tables 4 – 6. In addition to the products according to the invention (Example 1 – 11), which were taken into account in Tables 1 – 3, comparison products prepared according to the state of the art (Examples 12 – 16) were also taken into account.

5. Determination of the acceleration of drainage. (method of measurement and also an explanation of Table 4).

The characteristic freeness increase in °Schopper-Riegler was determined in accordance with the method in Instruction Sheet 107 of the Verein der Zellstoff-und Papierchemiker und Ingenieure (Association of Pulp and Paper Chemists and Engineers). In these examples, both the products according to the invention and the comparison products are added, as retention agents, in the form of their aqueous solutions, to a newsprint pulp suspension, the concentration of these aqueous solutions being so selected that 0.1 or 0.2 g of the retention agent together with 99.8 g or 99.9 g of the absolutely dry total solids content of the paper pulp suspension make up to 100 g = % by weight of total solids content. Thus, since the figures in grams correspond to the figures for % by weight, in Table 4 the amounts of retention agent added are indicated in % by weight in the abovementioned sense. The abovementioned newsprint pulp suspension was obtained by mechanical defibering of commercially available newsprint, followed by speck-free pulping of the defibrated product in a conventional kitchen mixer. The measurements were carried out at a pH value of 6.5 and 4.8 and these values were obtained using a 1% strength by weight alum solution. The fibre concentration was 2 g/l of water.

6. Determination of the flocculation (flotation or sedimentation); also an explanation of Table 5.

In order to determine the flocculation of the products, which have been prepared according to Examples 1 - 11, in accordance with the invention, and according to the Comparison Examples 12 - 15, a suspension, which has very similar properties to a paper or fibre suspension, of a Type 23/163 kaolin substance from Messrs. W. Priem, Bielefeld, which is known by those skilled in the art as an important filler in papermaking, was used. To prepare the suspension, a shaking cylinder of 500 ml capacity and with an internal diameter of 45 mm was used and a suspension having a concentration of 15 g of kaolin/l of water was produced in this cylinder and the pH value of the suspension was adjusted to 6.5 with hydrochloric acid. In every case this suspension was treated with a) 0.1% by weight and b) 0.2% by weight (absoblutely dry and relative to the kaolin solids) of one of the various retention agents obtained according to the abovementioned examples. The abovementioned suspension components were then distributed as uniformly as possible by shaking the cylinder (5 shakings for each example) and, after a sedimentation time of 1 and 2 minutes, the settling height of the flocculated kaolin was read off in cm in the measuring cylinder. At the same time, the degree of turbidity of the aqueous zone above the flocculated fraction was assessed empirically using the three gradings "turbid", "slightly turbid" and "clear", which can be seen in Table 5, and the degree of turbidity was taken as a criterion for the flocculating capacity per unit time (2 minutes).

7. Determination of the retention of fillers (also an explanation of Table 6). In this case also, in order to obtain comparable values, the same method of determination was used both for the 11 examples according to the invention and for the 4 further comparison examples. The retention of filler is generally characterised by the ash content of paper sheets which had been prepared on a "Rapid Kothen apparatus" using the method indicated in Instruction Sheet V/8/57 of the Verein der Zellstoff- und Papierchemiker und Ingenieure (Association of Pulp and Paper Chemists and Engineers) (the earlier version was Instruction Sheet 108).

The sheet of paper mentioned above, which is used to determine the retention capacity of the particular products according to the invention or the particular comparison products in every case had the following pulp composition:

80% of bleached sulphite cellulose (27° Schopper Riegler); 15% of china clay; 5% of titanium dioxide and 0.5% of alum (based on absolutely dry paper fibre). The stock consistency of the paper sheets was = 0.24 g/l of water and the pH value of the fibre suspension which can be prepared from the paper sheet by introducing it into water was 6.2. The addition of retention agent during the stock preparation was 0.02% by weight, based on absolutely dry retention agent or on absolutely dry paper fibre material.

The ash contents given in Table 6 are quoted in per cent by weight.

The individual examples which now follow are divided into two large groups, the group I comprising the examples in which polyvalent amines are employed, whilst the group of examples II comprises the examples in which monovalent amines are used. The group of examples I follows first.

I Example 1:

(1a) Preparation of the intermediate product A, according to the invention 1,125 g of dimethylamine (40% strength by weight aqueous solution = 10 mols) are filled into a glass vessel provided with stirrer, a thermometer and a reflux condenser. 1,067.4 g of hydrochloric acid (36.5% strength by weight = 10.7 mols) are then metered slowly into the dimethylamine, whilst stirring, so that the exothermic reaction temperature of 50° C, which results, is not exceeded. In order to accelerate the formation of dimethylammonium chloride, which takes place in this way, the abovementioned reaction mixture is cooled so that the total reaction time can be shortened to 1 hour. 1,888 g of epichlorohydrin (98% strength by weight = 20 mols) are then metered into the reaction mixture, which now contains in the main dimethylammonium chloride, so slowly that the reaction temperature again does not exceed 55° C and the addition of epichlorohydrin can be completed after two hours. The reaction of the epichlorohydrin with the dimethylammonium hydrochloride is complete 2 ½ hours after starting to meter in epichlorohydrin.

Intermediate analysis gives the following values:
pH value: 8.03
chloride: 379.8 g ≙ 99.95% of theory; the chloride being formed as a product when dimethylamine is neutralised with hydrochloric acid).

The next process step relates to the reaction of the abovementioned resulting reaction product, which now has the chlorine atoms of the epichlorohydrin at both ends of the molecule, with 1,289.6 g diethylenetriamine (≙ 12.5 mols). As a result of appropriately regulated metering, the reaction with diethylenetriamine is carried out so slowly that the exothermic reaction temperature does not exceed 80° C. After two hours, the reaction of the amines with the chlorine atoms of the epichlorohydrin has taken place, as could be shown with the aid of analysis, by means of the following values:
pH vaue: 7.95 chloride: 1,089.9 g ≙ 100% of theory (the total amount of chloride is made up by the equivalent amount of hydrochloric acid added on plus the equivalent amount of chloride liberated from he epichlorohydrin).

(Note: when the abovementioned 100% of theory of chloride are detectable, a solution of low viscosity is obtained. However, if this solution is exposed for a prolonged period to a temperature of between 50°–100° C, the viscosity of the solution increases, the extent of the increase depending on the duration of the treatment. A highly viscous intermediate product A obtained in this way requires substantially less epichlorohydrin for its reaction with the intermediate product B to give the end product C, without this leading to the drainage and retention capacity of the product in papermaking being impaired. Therefore, in the following text, with reference to the intermediate product A, the viscosity of the solution before and after the subsequent reaction is also quoted).

Viscosity of the intermediate product A in the form of its 71.35% strength by weight aqueous solution at 25° C before the subsequent reaction: 2,000 cP.

Viscosity of the intermediate product A in the form of its 71.35% strength by weight aqueous solution at 25° C, but after completion of the subsequent reaction, which is carried out for one hour at 80° C: 5,800 cP.

1b) Preparation of the intermediate product B 1,460.2 g of adipic acid (≙ 10 mols), 1,124.5 g of diethylenetriamine (≙ 10.9 mols) and 226.34 g of caprolactam (≙ 2 mols), in the form of the pure substances, were filled into a steel autoclave provided with a stirrer, a thermocouple and a distillation condenser. After blanketing the material in the autoclave with oxygen-free nitrogen, which thus replaces the residual gas mixture present, the monomer mixture is heated, after closing the vessel, to 160° C, whilst stirring, and is left at this temperature for 30 minutes, whilst stirring. The total amount of the water of reaction liberated and distilled off thereafter is 360 ml (= 100% of theory). The reaction mixture, which is free from water of condensation, is then heated to 180° C and stirred at this temperature for 2 hours. The reaction mixture continues to react and, for safety, nitrogen is passed continuously over the reaction mixture undergoing condensation. After cooling the melt of the polycondensation product to 135° C, a total of 2,553 ml of water is added, whilst continuing the cooling.

The resulting aqueous resin solution is characterised by the following data:

| solids content: | 48% by weight |
|---|---|
| amine number: | 285 mg KOH/1 g of resin |
| pH value: | 10.80 |
| viscosity: | 360 cP (25° C) |

(1c) Preparation of the end product C. according to the invention 1,074.0 g of the intermediate product A (obtained according to Example 1a ≙ 2 mols) are stirred, in a heated reaction vessel with a thermometer, a stirrer and a reflux condenser, with 1,960 g of the intermediate product B in the form of a 25% strength solution (obtained according to Example 1b ≙ 2 mols; the abovementioned molar amounts being relative to diethylenetriamine) and 2,080 ml of water to give a homogeneous mixture. After heating these reactants to 70° C, a total of 65.5 g of 98% strength by weight epichlorohydrin is metered in slowly, whilst maintaining the temperature indicated above, and the rise in viscosity is followed. After a reaction period of about 6 hours, a highly viscous, clear polymer solution (end product C) is obtained, the viscosity of which no longer changes under the above process conditions. 1,260 ml of water are then added and the resulting aqueous solution of the finished end product C is again homogenised for half an hour, whilst stirring and whilst the temperature falls. (The latter addition of water is termed "dilution water" in the summarising Table 3, which relates to the preparation of the end products C, according to the invention).

The tests carried out on the above end product C gave the following values:

| pH value: | 8.04 |
|---|---|
| solids content: | 21.6% by weight |
| viscosity: (at 25° C) | 210 cP |
| density: (at 20° C) | 1.046 g/cm$^3$ |

The further examples according to the invention, which follow, were carried out under the same process conditions, as indicated for Example 1 $a - c$. The quantities used in grams and mols were summarised in Table 1 for intermediate product A, in Table 2 for intermediate product B and in Table 3 for end product C. In order to provide a complete overall picture of the entire subject matter covered in these examples, the abovementioned Example 1a– 1c has also been included in the table. At the particular pH value indicated in the table, all the end products C listed in the table are stable on storage and uncomplicated to handle.

For reasons of space, in the following series of tables abbreviations have been used in place of the names of substances written out in full. An explanation of the abbreviations used in the table sequence for the chemical starting products is therefore given here, together with some data regarding their concentration or the medium in which they are dissolved.

An explanation regarding the source (No. of the printed earlier publication) of the comparison examples listed after the examples according to the invention is also given here.

| 1. | MMA: | Monomethylamine, always present as a 40% strength by weight aqueous solution. |
|---|---|---|
| 2. | DMA: | Dimethylamine, always present as a 40% strength by weight aqueous solution. |
| 3. | DEA: | Diethylamine, always present as the 100% strength by weight liquid. |
| 4. | MPA: | Monopropylamine, always present as the 100% strength by weight liquid. |
| 5. | DiPA: | Diisopropylamine, always present as the 100% strength by weight liquid. |
| 6. | MBA: | Monobutylamine, always present as a 97% strength by weight aqueous solution. |
| 7. | HCL: | Hydrochloric acid, always present as a 36.5% strength by weight aqueous solution. |
| 8. | Epi$^I$: | Epichlorohydrin, present as a 98% strength by weight aqueous solution. |
| 9. | Epi$^{II}$: | Epichlorohydrin, 100% strength. |
| 10. | DTRA: | Diethylenetriamine, present as the 100% strength by weight pure substance. |
| 11. | AA: | Adipic acid, present as the 100% strength by weight solid. |
| 12. | CL: | Caprolactam, present as the 100% strength by weight solid. |
| 13. | AH-S: | Salt from adipic acid and hexamethylenediamine, present as the 100% strength solid. |
| 14. | TTRA: | Triethylenetetramine, present as the 100% strength by weight pure substance. |

The values given in Tables 4, 5 and 6 for Example 1c according to the invention relate to both the end product C obtained with the intermediate product A which was not subjected to a subsequent reaction and to the end product C obtained with the (more highly viscous) intermediate product A which has been subjected to an appropriate subsequent reaction, since those properties of the end product C which are listed in Tables 4, 5 and 6 do not vary and are not dependent on the nature of the intermediate product A.

The comparison examples 13, 14, 15 and 16 listed in Tables 4, 5 and 6 relate to:

Example 13: Example 1 from DT-AS (German Published Specification) No. 1,771,814;
Example 14: Example A from DT-AS (German Published Specification) No. 1,795,392;
Example 15: Example 1 from DT-OS (German Published Specification) No. 2,209,242; and
Example 16: Example 1 from the earlier Patent Application by the undersigned DT-OS(german Published Specification) No. 25 53 430.7-44.

The rest of the products which are listed in the tables will follow and have been prepared within the scope of the examples listed there have been produced under the same process conditions as have been described in detail in Example 1a, 1b and 1c according to the invention.

Finally, the indeterminate number x quote in Table 1 below the expression "molar ratio" in the table heading relates to the molar amount of the reaction product obtained from dimethylamine, hydrochloric acid and epichlorohydrin, relative to 1 mol of dimethylamine, adjacent column relates to the molar amount of diethylenetriamine, relative to 1 mol of dimethylamine.

As can be seen from the tabulation, in Examples 1a – 9a according to the invention (Table 1), only the amounts of diethylenetriamine employed were varied, whilst in Example 10a the amounts of hydrochloric acid and epichlorohydrin were also varied and in Example 11a triethylenetetramine was used in place of diethlenetriamine.

It can be seen from Table 2 that in the preparation of the intermediate product B the amounts of the starting substances were kept unchanged in Example 1b – 6b, whilst in Examples 7b – 9b the amount of diethylenetriamine employed was varied. In 9b the salt obtained from adipic acid and hexamethylenediamine, which is not employed in the other examples, was used in addition. In Examples 10b and 11b, in addition, the amounts of caprolactam employed were reduced, relative to the starting amounts previously used.

It is surprising that despite this variation (which, of course, is also manifest in the changes in the quantities of the starting substances according to Table 3), the improvement in the retention of flushable solids as well as the acceleration of the drainage of suspensions and the more rapid treatment of industrial effluents are always considerable when these capacities are compared with the corresponding capacities of the previously known comparison substances according to the examples drawn from prior printed publications.

Details are given in the series of Tables 1 – 6 which now follows.

Table 1:

Group of Examples I
Preparation of intermediate products A, according to the invention

| Example | DMA solution g | mol | HCl g | mol | Epi$^1$ g | mol | DTRA g | mol | TTRA g | mol | molar ratio x | y | pH | chloride | % by weight of theory | Viscosity in cP "without"*) | "with"*) |
|---|---|---|---|---|---|---|---|---|---|---|---|---|---|---|---|---|---|
| 1a | 1125 | 10 | 1067.4 | 10.7 | 1888 | 20 | 1289.6 | 12.5 | — | — | 1.00 | 1.25 | 7.95 | 1089.9 | 100 | 2000 | 5800 |
| 2a | 1125 | 10 | 1067.4 | 10.7 | 1888 | 20 | 1547.5 | 15.0 | — | — | 1.00 | 1.25 | 9.05 | 1089.9 | 100 | — | — |
| 3a | 1125 | 10 | 1067.4 | 10.7 | 1888 | 20 | 2063.4 | 20.0 | — | — | 1.00 | 1.25 | 9.87 | 1089.9 | 100 | — | — |
| 4a | 1125 | 10 | 1067.4 | 10.7 | 1888 | 20 | 1289.6 | 12.5 | — | — | 1.00 | 1.25 | 7.95 | 1089.9 | 100 | — | — |
| 5a | 1125 | 10 | 1067.4 | 10.7 | 1888 | 20 | 1289.6 | 12.5 | — | — | 1.00 | 1.25 | 7.95 | 1089.9 | 100 | — | — |
| 6a | 1125 | 10 | 1067.4 | 10.7 | 1888 | 20 | 2063.4 | 20.0 | — | — | 1.00 | 1.25 | 9.87 | 1089.9 | 100 | — | — |
| 7a | 1125 | 10 | 1067.4 | 10.7 | 1888 | 20 | 1289.6 | 12.5 | — | — | 1.00 | 1.25 | 7.95 | 1089.9 | 100 | — | — |
| 8a | 1125 | 10 | 1067.4 | 10.7 | 1888 | 20 | 1289.6 | 12.5 | — | — | 1.00 | 1.25 | 7.95 | 1089.9 | 100 | — | — |
| 9a | 1125 | 10 | 1067.4 | 10.7 | 1888 | 20 | 1289.6 | 12.5 | — | — | 1.00 | 1.25 | 7.95 | 1089.9 | 100 | — | — |
| 10a | 1125 | 10 | 2134.8 | 21.4 | 1416 | 15 | 1289.6 | 12.5 | — | — | 1.00 | 1.25 | 8.40 | 1089.9 | 100 | — | — |
| 11a | 1125 | 10 | 1067.4 | 10.7 | 1888 | 20 | — | — | 1828.0 | 12.5 | 1.00 | 1.25 | 9.30 | 1089.9 | 100 | — | — |

*) "without" and "with" denote: viscosity of the solution of the intermediate product A "without" and "with" subsequent reaction in accordance with the explanation given above.

whilst the indeterminate number y in the heading of the

Table 2.

Group of Examples I

Preparation of intermediate products B

| Example | AA g | mol | DTRA g | mol | Starting materials Amounts of: CL g | mol | AH g | mol | solids content (% by weight) | 1 g of resin | amine number mg KOH/ viscosity (cP) | pH value |
|---|---|---|---|---|---|---|---|---|---|---|---|---|
| 1b | 1460.2 | 10 | 1124.5 | 10.9 | 226.34 | 2 | — | — | 48.00 | 285 | 360 | 10.80 |
| 2b | 1460.2 | 10 | 1124.5 | 10.9 | 226.34 | 2 | — | — | 48.00 | 285 | 360 | 10.80 |
| 3b | 1460.2 | 10 | 1124.5 | 10.9 | 226.34 | 2 | — | — | 48.00 | 285 | 360 | 10.81 |
| 3b | 1460.2 | 10 | 1124.5 | 10.9 | 226.34 | 2 | — | — | 48.00 | 285 | 360 | 10.81 |
| 4b | 1460.2 | 10 | 1124.5 | 10.9 | 226.34 | 2 | — | — | 48.00 | 285 | 360 | 10.80 |
| 5b | 1460.2 | 10 | 1124.5 | 10.9 | 226.34 | 2 | — | — | 47.90 | 284 | 358 | 10.75 |
| 6b | 1460.2 | 10 | 1124.5 | 10.9 | 226.34 | 2 | — | — | 47.90 | 284 | 358 | 10.75 |

Table 2.-continued

Group of Examples I

Preparation of intermediate products B

| Example | AA g | AA mol | DTRA g | DTRA mol | CL g | CL mol | AH g | AH mol | Intermediate product B; Analytical values solids content (% by weight) | amine number mg KOH/ 1 g of resin | viscosity (cP) | pH value |
|---|---|---|---|---|---|---|---|---|---|---|---|---|
| 7b | 1460.2 | 10 | 1031.7 | 10.0 | 226.34 | 2 | — | — | 48.10 | 237 | 870 | 10.68 |
| 8b | 1460.2 | 10 | 1031.7 | 10.0 | 226.34 | — | — | — | 47.95 | 266 | 758 | 10.80 |
| 9b | 1460.2 | 10 | 1031.7 | 10.0 | — | — | 452.68 | 2 | 48.10 | 283 | 380 | 10.60 |
| 10b | 1460.2 | 10 | 1124.5 | 10.9 | 226.34 | 2 | — | — | 48.00 | 285 | 360 | 10.80 |
| 11b | 1460.2 | 10 | 1124.5 | 10.9 | 226.34 | 2 | — | — | 48.00 | 285 | 360 | 10.80 |

Table 3:

Group of Examples I
Preparation of the end products C according to the invention
Starting materials

| Ex. | Int. prod. A g | Int. prod. A mol | Int. prod. A acc. to Ex. | Int. prod. B (based on DTRA) g in 25% strength solution | Int. prod. B mol | Int. prod. B acc. to Ex. | molar ratio of: int. prod. A | molar ratio of: int. prod. B | ml of dilution water | epichlorohydrin in g "without" | epichlorohydrin in g "with"*) | pH | End products; analytical values solids content in % | viscosity in cP "without" | viscosity in cP "with" *) | density (20° C) in g/cm³ |
|---|---|---|---|---|---|---|---|---|---|---|---|---|---|---|---|---|
| 1c | 1074 | 2 | 1a | 1960 | 2 | 1b | 1 | 1 | 1260 | 65.5 | 40.2 | 8.04 | 21.60 | 210 | 216 | 1,046 |
| 2c | 1125.6 | 2 | 2a | 1960 | 2 | 2b | 1 | 1 | 1320 | 144.5 | — | 7.85 | 21.10 | 225 | — | 1,048 |
| 3c | 1228.8 | 2 | 3a | 1960 | 2 | 3b | 1 | 1 | 1441 | 290.5 | — | 7.68 | 20.80 | 180 | — | 1,052 |
| 4c | 537.0 | 1 | 4a | 1960 | 2 | 4b | 0.5 | 1 | 630 | 42.8 | — | 8.42 | 21.16 | 160 | — | 1,054 |
| 5c | 1074 | 2 | 5a | 980 | 1 | 5b | 2 | 1 | 545 | 54.6 | — | 7.72 | 20.50 | 169 | — | 1,040 |
| 6c | 1228.8 | 2 | 6a | 980 | 1 | 6b | 2 | 1 | 720 | 498.6 | — | 6.35 | 21.00 | 190 | — | 1,042 |
| 7c | 1074 | 2 | 7a | 1886 | 2 | 7b | 1 | 1 | 1275 | 24.5 | — | 7.75 | 20.60 | 260 | — | 1,049 |
| 8c | 1074 | 2 | 8a | 1705.6 | 2 | 8b | 1 | 1 | 1205 | 23.8 | — | 7.81 | 20.90 | 230 | — | 1,050 |
| 9c | 1074 | 2 | 9a | 2010 | 2 | 9b | 1 | 1 | 1309 | 62.6 | — | 8.20 | 20.90 | 235 | — | 1,049 |
| 10c | 2386.2 | 2 | 10a | 1960 | 2 | 10b | 1 | 1 | 1282 | 39.8 | — | 8.90 | 21.00 | 370 | — | 1,044 |
| 11c | 1395.0 | 2 | 11a | 1960 | 2 | 11b | 1 | 1 | 1395 | 74.3 | — | 8.55 | 21.10 | 225 | — | 1,048 |
| 1b₁ **) | — | — | — | 1960 | 2 | 1b | — | — | 374 | 29.7 | — | 9.05 | 20.90 | 160 | — | 1,090 |

"without" denotes: without subsequent reaction;
"with" denotes: with subsequent reaction, as in Table 1, on the far right.

The abovementioned Example 1b₁ serves as a comparison example for the preceding examples according to the invention. It is intended to show that without incorporation of the intermediate product A according to the invention, that is to say solely with crosslinking of the known intermediate product B with epichlorohydrin, it is not possible to carry out the process, according to the invention, for improving the retention, drainage and treatment because, as can be seen from Tables 4 - 6 which follow (also see Examples 1b₁), the retention, drainage and flocculation values obtained are considerably poorer than those obtained in the examples according to the invention.

Table 4:

Group of Examples I
Acceleration of drainage:
measured by the freeness increase in ° Schopper Riegler

| | Example | Examples with added substance pH 6.5 0.1% by weight | pH 6.5 0.2% by weight | pH 4.8 0.1% by weight | pH 4.8 0.2% by weight | Comparison Example without added substance (blank sample) at pH 6.5 | at pH 4.8 |
|---|---|---|---|---|---|---|---|
| 1c | | 23 | 17 | 32 | 30 | 45 | 48 |
| 2c | | 24 | 17 | 30 | 28 | 45 | 49 |
| 3c | | 20 | 19 | 31 | 30 | 45 | 48 |
| 4c | Product C | 21 | 19 | 33 | 31 | 45 | 48 |
| 5c | according to | 20 | 19 | 30 | 28 | 46 | 49 |
| 6c | the invention | 19 | 18 | 31 | 30 | 44 | 49 |
| 7c | added | 18 | 17 | 32 | 32 | 45 | 48 |
| 8c | | 21 | 19 | 34 | 32 | 46 | 49 |
| 9c | | 22 | 18 | 33 | 30 | 45 | 48 |
| 10c | | 21 | 19 | 34 | 31 | 44 | 49 |
| 11c | | 22 | 20 | 35 | 30 | 45 | 48 |
| 12 | 1b₁ | 33 | 20 | 36 | 29 | 45 | 48 |
| 13 | Ex. 1 from DT-AS (German Published Specification) 1,771,814 | 32 | 22 | 36 | 30 | 44 | 49 |
| 14 | Ex. A from DT-OS (German Published Specification) 1,795,392 | 34 | 23 | 38 | 34 | 45 | 48 |
| 15 | Ex. 1 from DT-OS (German Published Specification) 2,209,242 | 40 | 38 | 41 | 40 | 45 | 48 |
| 16 | Ex. 1 from | 26 | 22 | 35 | 30 | 46 | 49 |

Table 4:-continued

| | Group of Examples I Acceleration of drainage: measured by the freeness increase in ° Schopper Riegler | | | | | |
|---|---|---|---|---|---|---|
| | Examples with added substance | | | | Comparison Example without added substance (blank sample) | |
| | pH 6.5 | | pH 4.8 | | | |
| Example | 0.1% by weight | 0.2% by weight | 0.1% by weight | 0.2% by weight | at pH 6.5 | at pH 4.8 |
| P 23 53 430.7-44 | | | | | | |

Table 5:

Group of Examples I
Water treatment for papermaking

| Example | | Sedimentation time (after minutes) | Flocculation level in cm with addition of an amount of | | Clear zone of water above the flocculated kaolin (after 2 minutes sedimentation time). The figures indicated denote: kaolin added in % by weight | | |
|---|---|---|---|---|---|---|---|
| | | | 0.1% by weight of kaolin | 0.2% by weight of kaolin | turbid | slightly turbid | clear |
| 1c | | 1 | 14.0 | 13.0 | | | |
| | | 2 | 8.0 | 7.2 | — | 0.1 | 0.2 |
| 2c | | 1 | 15.2 | 14.2 | | | |
| | | 2 | 9.1 | 7.6 | — | 0.1 | 0.2 |
| 3c | | 1 | 14.4 | 13.4 | | | |
| | | 2 | 8.2 | 7.4 | — | 0.1 | 0.2 |
| 4c | | 1 | 13.9 | 12.6 | | | |
| | | 2 | 7.8 | 6.9 | — | 0.1 | 0.2 |
| 5c | | 1 | 14.1 | 13.2 | | | |
| | | 2 | 8.0 | 7.0 | — | 0.1 | 0.2 |
| 6c | | 1 | 14.9 | 13.7 | | | |
| | | 2 | 8.6 | 7.4 | — | 0.1 | 0.2 |
| 7c | | 1 | 14.2 | 13.1 | | | |
| | | 2 | 8.0 | 7.1 | — | 0.1 | 0.2 |
| 8c | | 1 | 14.3 | 13.2 | | | |
| | | 2 | 8.4 | 7.2 | — | 0.1 | 0.2 |
| 9c | | 1 | 14.8 | 13.6 | | | |
| | | 2 | 8.8 | 7.8 | — | 0.1 | 0.2 |
| 10c | | 1 | 14.8 | 13.8 | | | |
| | | 2 | 8.5 | 7.3 | — | 0.1 | 0.2 |
| 11c | | 1 | 15.2 | 14.0 | | | |
| | | 2 | 9.1 | 7.6 | — | 0.1 | 0.2 |
| 12 | 1 $b_1$ | 1 | 16.2 | 13.9 | | | |
| | | 2 | 9.9 | 7.4 | 0.1 | 0.2 | — |
| 13 | Ex. 1 from DT-AS (German Published Specification) 1,771,814 | 1 | 16.6 | 14.6 | | | |
| | | 2 | 10.3 | 8.6 | 0.1 | 0.2 | — |
| 14 | Ex. A from DT-OS (German Published Specification) 1,795,392 | 1 | 17.1 | 15.4 | | | |
| | | 2 | 11.6 | 9.2 | 0.1 | 0.2 | — |
| 15 | Ex. 1 from DT-OS (German Published Speicifcation 2,209,242 | 1 | 20.0 | 19.2 | | | |
| | | 2 | 18.0 | 17.6 | 0.1 | — | — |
| 16 | Ex. 1 from P 23 53 430.7-44 | 1 | 16.2 | 13.8 | | | |
| | | 2 | 10.0 | 7.3 | 0.1 | 0.2 | — |

Table 6:

Group of Examples I
Filler retention capacity

| Example | Ash content of the paper, in % by weight* |
|---|---|
| 1c | 7.90 |
| 2c | 8.05 |
| 3c | 8.01 |
| 4c | 7.95 |
| 5c | 8.10 |
| 6c | 7.92 |
| 7c | 8.02 |
| 8c | 7.98 |
| 9c | 7.96 |
| 10c | 8.10 |
| 11c | 7.91 |
| 12 1b$_1$ | 7.10 |
| 13 Example 1 from DT-AS (German Published Specification) 1,771,814 | 7.08 |
| 14 Example A from DT-OS (German Published Specification) 1,795,392 | 6.98 |
| 15 Example 1 from DT-OS (German Published Specification) 2,209,242 | 6.35 |
| 16 Example 1 from P 23 53 430.7-44 | 7.42 |
| Blank value (without addition of resin) | 5.95 |

*The higher the ash content, the better the retention capacity.

The individual examples of the group of examples II (use of monovalent amines) now follow.

II Example 1:

1a) Preparation of the intermediate product A. according to the invention

1,125 g of dimethylamine (40% strength by weight aqueous solution ≙ 10 mols) are filled into a glass vessel provided with a stirrer, a thermometer and a reflux condenser. 1,067.4 g of hydrochloric acid (36.5% strength by weight = 10.7 mols) are then added to the dimethylamine, whilst stirring, so that the exothermic reaction temperature of 50° C, which results, is not exceeded. In order to accelerate the formation of dimethylammonium hydrochloride, which takes place in this way, the abovementioned reaction mixture is cooled and the total reaction time is shortened to one hour thereby.

After completion of this reaction, 1,850 g of epichlorohydrin ($\triangleq$100% strength by weight solution $\triangleq$ 20 mols) are then metered into the reaction mixture, which now contains in the main diemthylammonium hydrochloride, so slowly that the reaction temperature again does not exceed 55° C and the addition of epichlorohydrin can be terminated after two hours. The reaction of the epichlorohydrin with the dimethylammonium hydrochloride is complete 2½ hours after starting to meter in the epichlorohydrin.

Intermediate analysis gives the following values:
pH value: 8.03;
chloride: 379.8 g ($\triangleq$ 99.95% of theory; the chloride being formed as the product when dimethylamine is neutralised with hydrochloric acid).

The next process step within the scope of this example 1a relates to the reaction of the abovementioned resulting reaction product, which now has the chlorine atoms of the epichlorohydrin at both molecule-ends, with 2,255.0 g of dimethylamine ($\triangleq$ 40% strength by weight $\triangleq$ 20 mols) in aqueous solution. As a result of appropriately regulated metering, the reaction with dimethylamine is carried out so slowly that the exothermic reaction temperature does not exceed 70° C. After two hours, the reaction of the amines with the chlorine atoms of the epichlorohydrin has taken place, as could be shown with the aid of analysis, by means of the following values: theoretical solids content: 57.9% by weight;
pH value: 7.3;
chloride: 1,089.9 g = 100% of theory (the total amount of chloride is made up by the equivalent amount of hydrochloric acid added on plus the equivalent amount of chloride liberated from the epichlorohydrin).

(1b) Preparation of the intermediate product B 1,460.2 g of adipic acid (100% strength by weight = 10 mols; solid), 1,124.5 g of diethylenetriamine (100% strength by weight = 10.9 mols; liquid) and 524.6 g of adipic acid/hexamethylenediammonium adipate (100% strength by weight = 2 mols; solid) in the form of their pure substances are filled into a pressure vessel provided with a stirrer, a temperature indicator and a condenser.

After blanketing the abovementioned mixture of substances with oxygen-free nitrogen, which thus replaces the overrising residual gas mixture, the monomer mixture is heated, after closing the vessel, to 160° C, whilst stirring, and left at this temprature for 30 minutes, whilst stirring. The total amount of the water of reaction liberated and distilled off thereafter is 432 ml. The reaction mixture, which is free from water of condensation, is then heated to 180° C and stirred at this temperature for two hours. The reaction mixture continues to react and, for safety, nitrogen is passed continuously over the reaction mixture undergoing condensation. After cooling the melt of the polycondensation product to 135° C, a total of 2,890 ml of water are added, whilst continuing to cool, finally to below 40° C.

The resulting aqueous resin solution (finished intermediate product B) is characterised by the following data:

| | |
|---|---|
| solids content: | 48% by weight |
| liquids content (water): | 52% by weight |
| amine number: | 285 mg KOH/1 g of resin |
| pH value: | 10.8 |
| viscosity: | 360 cP (25° C) |

(1c) Preparation of the end product C, according to the invention 1,259 g, relative to the 25% strength by weight solution of the intermediate product A, of a 25% strength by weight solution which was obtained by diluting the 57.9% strength by weight solution obtained as the intermediate product A according to the invention and which corresponds to 2 mols, were introduced into a heated reaction vessel provided with a thermometer, stirrer and a reflux condenser. 1,960 g of a further 25% strength by weight solution which was obtained by diluting the 48% strength by weight solution obtained as the intermediate product B and which also corresponds to 2 mols (relative to diethylenetriamine) were added to the former solution. The abovementioned intermediate products A and B are obtained as described in the abovementioned Examples 1a and 1b. After heating these reactants A and B to 80° C, a total of 59.9 ml of 100% strength by weight liquid epichlorohydrin is metered in slowly, whilst maintaining the indicated temperature mentioned above, and the rise in viscosity is followed. After a reaction period of about 6 hours, a highly viscous, clear polymer solution is obtained in the form of the end product C, the viscosity of which no longer changes under the above process conditions. 1,219 ml of water are then added and the resulting aqueous solution of the finished product C is again homogenised for half an hour, whilst stirring and whilst the temperature falls. (the latter addition of water is termed "dilution water" in summarising Table 3, which relates to the preparation of the end products C, according to the invention).

The tests carried out on the above end product C in the form of the abovementioned aqueous solution gives the following values:

| | |
|---|---|
| pH value: | 7.2 |
| solids content: | 20.4% by weight |
| liquids content: | 79.6% by weight |
| viscosity (at 25° C): | 240 cP |
| density (at 20° C): | 1.058 g/cm³ |

The further examples according to the invention which follow are carried out under the same process conditions as indicated for Example 1a – c. The quantities used in grams and mols are summarised in Table 1 for the intermediate product A, in Table 2 for the intermediate product B and in Table 3 for the end product C. In order to provide a complete overall picture of the entire subject matter covered in these examples, the abovementioned Example 1a–c has also been included in the table. At the particular pH value indicated in the table, all the end products C listed in the table are stable on storage and can be handled easily.

For reasons of space, in the following series of tables abbreviations have been used in place of the names of substances written out in full, in the same way as in the group of Examples I. (The abbreviations have already been explained at the corresponding point in the preceding Group of Examples In on page 28).

An explanation regarding the origin (No. of the printed earlier publication) of the comparison examples listed after the examples according to the invention is given at the corresponding point.

Table 1:

Group of Examples II
Preparation of the intermediate products A, according to the invention

| Example No. | DMA solution g | mol =x | HCl g | mol | Epichlorohydrin mol | g | Type of amine | mol =y | g | Molar ratio x : y | pH | Solids content in % by weight | Chloride % by weight of theory | Viscosity in cP (at 25° C) |
|---|---|---|---|---|---|---|---|---|---|---|---|---|---|---|
| 1a | 1125 | 10 | 1067.4 | 10.7 | 20 | 1850 | DMA | 20 | 2255 | 1:2 | 7.3 | 57.9 | 100 | below 50 |
| 2a | 1125 | 10 | 1067.4 | 10.7 | 20 | 1850 | DMA | 20 | 2255 | 1:2 | 7.3 | 57.9 | 100 | below 50 |
| 3a | 1125 | 10 | 1067.4 | 10.7 | 20 | 1850 | DMA | 20 | 2255 | 1:2 | 7.3 | 57.9 | 100 | below 50 |
| 4a | 1125 | 10 | 1067.4 | 10.7 | 20 | 1850 | DMA | 20 | 2255 | 1:2 | 7.3 | 57.9 | 100 | below 50 |
| 5a | 1125 | 10 | 1067.4 | 10.7 | 20 | 1850 | DMA | 20 | 2255 | 1:2 | 7.3 | 57.9 | 100 | below 50 |
| 6a | 1125 | 10 | 1067.4 | 10.7 | 20 | 1850 | DMA | 20 | 2255 | 1:2 | 7.3 | 57.9 | 100 | below 50 |
| 7a | 1125 | 10 | 1067.4 | 10.7 | 20 | 1850 | MMA | 20 | 1555 | 1:2 | 7.5 | 51.2 | 100 | below 50 |
| 8a | 1125 | 10 | 1067.4 | 10.7 | 20 | 1850 | DEA | 20 | 1462 | 1:2 | 7.45 | 75.0 | 100 | below 50 |
| 9a | 1125 | 10 | 1067.4 | 10.7 | 20 | 1850 | MPA | 20 | 1182 | 1:2 | 7.20 | 74.0 | 100 | below 50 |
| 10a | 1125 | 10 | 1067.4 | 10.7 | 20 | 1850 | DiPA | 20 | 2024 | 1:2 | 7.20 | 78.0 | 100 | below 50 |
| 11a | 1125 | 10 | 1067.4 | 10.7 | 20 | 1850 | MBA | 20 | 1462 | 1:2 | 7.10 | 75.0 | 100 | below 50 |
| 12a | 1125 | 10 | 1067.4 | 10.7 | 20 | 1850 | DMA / MMA | 10 / 10 | 1125 / 777.5 | 1:2 | 7.3 | 58.0 | 100 | below 50 |

Table 2:

Group of Examples II
Preparation of the intermediate products B

| | Starting material (data in grams and mols) | | | | | | | | Intermediate product B (analytical values) | | | |
|---|---|---|---|---|---|---|---|---|---|---|---|---|
| Example | AA g | mol | DTRA g | mol | CL* g | mol | AH-S* g | mol | Solid % by weight | Amine number mg KOH/ 1 g of resin | Viscosity cP | pH value |
| 1b | 1460.2 | 10 | 1124.5 | 10.9 | — | — | 452.7 | 2 | 48.00 | 285 | 360 | 10.9 |
| 2b | 1460.2 | 10 | 1124.5 | 10.9 | 226.3 | 2 | — | — | 48.10 | 285 | 360 | 10.8 |
| 3b | 1460.2 | 10 | 1031.7 | 10.0 | — | — | — | — | 47.95 | 266 | 758 | 10.6 |
| 4b | 1460.2 | 10 | 1031.7 | 10.0 | — | — | 452.7 | 2 | 48.10 | 237 | 870 | 10.7 |
| 5b | 1460.2 | 10 | 1031.7 | 10.0 | 226.3 | 2 | — | — | 48.00 | 285 | 360 | 10.9 |
| 6b | 1460.2 | 10 | 1124.5 | 10.9 | — | — | 452.7 | 2 | 48.10 | 285 | 360 | 10.8 |
| 7b | 1460.2 | 10 | 1124.5 | 10.9 | — | — | 452.7 | 2 | 48.00 | 285 | 360 | 10.8 |
| 8b | 1460.2 | 10 | 1124.5 | 10.9 | — | — | 452.7 | 2 | 48.18 | 281 | 365 | 10.7 |
| 9b | 1460.2 | 10 | 1124.5 | 10.9 | — | — | 452.7 | 2 | 48.18 | 281 | 365 | 10.7 |
| 10b | 1460.2 | 10 | 1124.5 | 10.9 | — | — | 452.7 | 2 | 48.18 | 281 | 365 | 10.7 |
| 11b | 1460.2 | 10 | 1124.5 | 10.9 | — | — | 452.7 | 2 | 48.18 | 281 | 365 | 10.7 |
| 12b | 1460.2 | 10 | 1124.5 | 10.9 | — | — | 452.7 | 2 | 48.18 | 281 | 365 | 10.7 |

*When using AH salt, 2,890 ml of dilution water are employed (see Example 1b); when CL (= caprolactam) is used, however, only 2,553 ml of dilution water are employed.

Table 3:

Group of Example II
Preparation of the end products C, according to the invention

| | Starting material Amounts of intermediate product A and B fed in the form of their 25% strength by weight solutions | | | | | | | | | | | | |
|---|---|---|---|---|---|---|---|---|---|---|---|---|---|
| | A | | | | B | | Molar ratio of intermediate product A to B | Dilution water in ml | Epichlorohydrin in g | pH | Solid in % by weight | Viscosity in cP | Density at 20° C in g/cm² |
| Example | g | mol | acc. to Example in Table 1 | g | mol | acc. to Example in Table 2 | | | | | | | |
| 1c | 2916 | 2 | 1a | 1960 | 2 | 1b | 1:1 | 1219 | 59.9 | 7.40 | 20.50 | 182 | 1.060 |
| 2c | 4375 | 3 | 2a | 1799 | 2 | 2b | 1.5:1 | 1543 | 103.7 | 6.80 | 20.05 | 175 | 1.051 |
| 3c | 2916 | 2 | 3a | 1706 | 2 | 3b | 1:1 | 1156 | 49.5 | 7.20 | 20.65 | 210 | 1.062 |
| 4c | 2916 | 2 | 4a | 1886 | 2 | 4b | 1:1 | 1201 | 61.0 | 7.15 | 20.13 | 215 | 1.059 |
| 5c | 2916 | 2 | 5a | 1799 | 2 | 5b | 1:1 | 1179 | 65.3 | 7.25 | 20.47 | 260 | 1.057 |
| 6c | 1459 | 1 | 6a | 1960 | 2 | 6b | 0.5:1 | 855 | 39.2 | 7.90 | 20.81 | 190 | 1.071 |
| 7c | 2533 | 2 | 7a | 1960 | 2 | 7b | 1:1 | 1123 | 57.2 | 7.55 | 20.25 | 195 | 1.058 |
| 8c | 3206 | 2 | 8a | 1960 | 2 | 8b | 1:1 | 1291 | 64.5 | 7.30 | 20.20 | 195 | 1.061 |
| 9c | 2822 | 2 | 9a | 1960 | 2 | 9b | 1:1 | 1196 | 74.5 | 7.09 | 20.42 | 198 | 1.058 |
| 10c | 3654 | 2 | 10a | 1960 | 2 | 10b | 1:1 | 1403 | 79.2 | 7.15 | 20.18 | 235 | 1.060 |
| 11c | 3206 | 2 | 11a | 1960 | 2 | 11b | 1:1 | 1291 | 69.2 | 7.15 | 20.31 | 240 | 1.056 |
| 12c | 2647 | 2 | 12a | 1960 | 2 | 12b | 1:1 | 1152 | 58.8 | 7.05 | 20.24 | 215 | 1.059 |
| 13c | — | — | — | 1960 | 2 | 1b | — | — | 29.7 | 9.02 | 20.70 | 165 | 1.090 |

Table 4:

Group of Examples II
Acceleration of drainage; measured by the freeness increase in Schopper Riegler
On addition of end product C (Examples 1 – 12) or of known comparison substances (Examples 13 – 16) to paper pulp suspensions at a pH of:

| Example No. | 4.8 in amounts of % by weight of | | | 6.5 in amounts of % by weight of | | | Paper pulp suspensions without addition of end product C or without comparison substances (blank samples) at a pH of: | |
|---|---|---|---|---|---|---|---|---|
| | 0.1 | 0.2 | 0.3 | 0.1 | 0.2 | 0.3 | 4.8 | 6.5 |
| 1c | 41 | 35 | 33 | 42 | 30 | 26 | 56 | 52 |
| 2c | 44 | 37 | 36 | 43 | 32 | 27 | 56 | 52 |
| 3c | 44 | 36 | 33 | 43 | 33 | 28 | 56 | 52 |
| 4c | 44 | 37 | 35 | 42 | 32 | 27 | 56 | 52 |
| 5c | 43 | 36 | 34 | 44 | 32 | 28 | 56 | 52 |
| 6c | 43 | 37 | 35 | 45 | 34 | 29 | 56 | 52 |
| 7c | 43 | 36 | 34 | 44 | 31 | 27 | 56 | 52 |
| 8c | 44 | 37 | 35 | 42 | 31 | 28 | 56 | 52 |
| 9c | 44 | 36 | 35 | 42 | 31 | 28 | 56 | 52 |
| 10c | 43 | 37 | 36 | 43 | 32 | 29 | 56 | 52 |
| 11c | 45 | 38 | 35 | 45 | 33 | 29 | 56 | 52 |
| 12c | 43 | 36 | 34 | 44 | 31 | 27 | 56 | 52 |
| 13c | 49 | 42 | 40 | 48 | 37 | 34 | 56 | 52 |
| 14[x] | 50 | 42 | 39 | 46 | 36 | 32 | 56 | 52 |
| 15[xx] | 46 | 40 | 38 | 44 | 32 | 29 | 56 | 52 |
| 16[xxx] | 45 | 39 | 37 | 42 | 29 | 26 | 56 | 52 |

[x](Example A from DT-OS (German Published Specification) 1,795,392)
[xx](Example 1 from DT-OS (German Published Specification) 2,353,430)
[xxx](Example 1c from P 25 02 874)

Table 5:

Group of Examples II
Water treatment for papermaking using kaolin as the flocculating agent

| Example | Sedimentation time (after minutes) | Flocculation level of the kaolin in cm | | Clear zone of water above the flocculated kaolin (after 2 minutes sedimentation time) at 0.1% by weight (substance added) and 0.2% by weight | |
|---|---|---|---|---|---|
| | | 0.1% by weight of substance added | 0.2% by weight of substance added | 0.1 | 0.2 |
| 1c | 1 | 15.2 | 13.5 | slightly turbid | clear |
| | 2 | 9.0 | 7.8 | slightly turbid | clear |
| 2c | 1 | 15.1 | 13.2 | slightly turbid | clear |
| | 2 | 8.9 | 7.7 | slightly turbid | clear |
| 3c | 1 | 15.5 | 13.7 | slightly turbid | clear |
| | 2 | 9.2 | 8.4 | slightly turbid | clear |
| 4c | 1 | 14.9 | 13.6 | slightly turbid | clear |
| | 2 | 8.9 | 7.9 | slightly turbid | clear |
| 5c | 1 | 15.0 | 13.3 | slightly turbid | clear |
| | 2 | 9.0 | 8.0 | slightly turbid | clear |
| 6c | 1 | 15.9 | 13.6 | slightly turbid | clear |
| | 2 | 9.8 | 7.9 | slightly turbid | clear |
| 7c | 1 | 15.6 | 13.8 | slightly turbid | clear |
| | 2 | 9.5 | 8.1 | slightly turbid | clear |
| 8c | 1 | 15.2 | 13.7 | slightly turbid | clear |
| | 2 | 8.8 | 8.5 | slightly turbid | clear |
| 9c | 1 | 16.8 | 14.7 | slightly turbid | clear |
| | 2 | 10.4 | 8.8 | slightly turbid | clear |
| 10c | 1 | 15.8 | 13.9 | slightly turbid | clear |
| | 2 | 9.9 | 8.2 | slightly turbid | clear |
| 11c | 1 | 15.9 | 13.8 | slightly turbid | clear |
| | 2 | 9.9 | 8.0 | slightly turbid | clear |
| 12c | 1 | 15.6 | 13.8 | slightly turbid | clear |
| | 2 | 9.7 | 8.2 | slightly turbid | clear |
| 13c | 1 | 16.8 | 14.6 | turbid | slightly turbid |
| | 2 | 10.4 | 8.9 | turbid | slightly turbid |
| 14 (Example A from DT-OS (German Published Specification) 1,795,392) | 1 | 16.2 | 14.4 | turbid | slightly turbid |
| | 2 | 10.1 | 8.8 | turbid | slightly turbid |
| 15 (Example 1 from DT-OS (German Published Specification) 23 53 430) | 1 | 16.0 | 14.1 | turbid | slightly turbid |
| | 2 | 9.9 | 8.7 | turbid | slightly turbid |
| 16 (Example 1c from Application P 25 02 874) | 1 | 15.7 | 13.8 | slightly turbid | clear |
| | 2 | 9.4 | 8.1 | slightly turbid | clear |

Group Of Examples II

Table 6:

| Example | Group of Examples II Filler retention capacity Ash content of the paper (absolutely dry) in % by weight |
|---|---|
| 1c | 7.60 |
| 2c | 7.45 |
| 3c | 7.75 |
| 4c | 7.55 |
| 5c | 7.84 |
| 6c | 7.58 |
| 7c | 7.80 |
| 8c | 7.4 |
| 9c | 7.80 |
| 10c | 7.75 |
| 11c | 7.39 |
| 12c | 7.71 |
| 13c | 6.80 |
| 14 Example A from DT-OS (German Published Specification) 1,795,392 | 7.02 |
| 15 Example 1 from DT-OS (German Published Specification) 2,353,430 | 7.12 |
| 16 Example 1c from P 25 02 874 | 7.46 |
| 17 Blank value (without addition) | 5.86 |

The use of the auxiliary agent, according to the invention, for improving the retention of flushable solids as well as for accelerating the drainage of suspensions and for the more rapid treatment of industrial waters, effluents and sludges by adding basic water-soluble polymers according to the invention is not restricted to the paper industry. It is equally possible, in other branches of industry, to treat industrial waters, to purify effluents and to condition sludge, using the auxiliary agent according to the invention.

The treatment of sludge here comprises the treatment of both raw sludge and activated sludge. The auxiliary agents according to the invention can be employed equally well in sludge thickening and sludge flotation processes.

It is noteworthy that the abovementioned auxiliary agents are not sensitive, for example in the clarification process, to the addition of very diverse other materials. Inorganic flocculating agents, such as, for example, agents based on aluminium salts and iron salts or based on lime compounds, can therefore be added without problems, and without a resulting adverse effect on the auxiliary agent according to the invention.

When the auxiliary agent is used in sedimentation ponds and settling tanks, it is advisable to use it in an amount of about 0.1 – 4 mg per liter of the substance to be clarified.

If, in the course of conditioning effluent sludges, by draining in dry gels or by mechanical processes (for example centrifuging), better and more rapid removal of the water from the sludge is intended, it is best to add 2 – 12 kg of the auxiliary agent according to the invention to one metric ton of dry sludge. In sludge stabilisation it is generally advisable to employ 50 – 150 mg of the auxiliary agent according to the invention. The sludge is here stabilised in an advantageous manner in so far as the formation of break-resistant flocks is promoted by the auxiliary agent.

Thus, it can be stated quite generally that although the abovementioned auxiliary agent according to the invention can be used mainly in the paper industry, it can also be used fairly successfully in other fields, such as water purification and treatment.

Depending on the choice of the process particularly preferred by those skilled in the art, it is, of course, possible when using the abovementioned auxiliary agent according to the invention that, in papermaking, the other substances required there, such as, for example, dyestuffs, anti-oxidants, optical brighteners and fluorescent agents are not separately added to the paper but are already mixed with the auxiliary agent according to the invention before the addition, since there is no sensitivity even against these substances. In fact, those skilled in the art sometimes prefer to use the abovementioned process, because, for example, optical brighteners and fluorescent agents are in general required in only small amounts in the paper in order to achieve the desired change in the appearance of the paper.

Moreover, the auxiliary agent, according to the invention can also be employed advantageously in the field of papermaking as an agent to improve the shear stability, for example in pumps, vibratory screens and the like.

Furthermore the auxiliary agent can be applied successfully for example, as a hair fixative or as anchoring coating agents which are in themselves hydrophobic and are applied in the form of aqueous dispersions or other solutions, say onto carrier substances such as, for example, sheet-like structures of all types.

After it has been rendered acid, the auxiliary according to the invention can also be used as an agent for improving the wet strength of sheet-like structure, such as in particular, paper.

If, as already indicated above, only such an amount of crosslinking agent, for example in the form of epichlorohydrin, is used for linking the intermediate product A according to the invention to the known intermediate product B, that the crosslinking agent is completely consumed in linking A to B to give C, the auxiliary according to the invention is fairly stable on storage even in a basic medium.

If it is not possible for certain reasons to adhere to the suitable and advantageous procedure mentioned above, because, for example, more epichlorohydrin is added than indicated in the Examples 1 – 13 according to the invention, the auxiliary according to the invention can nevertheless readily be used, but it is then necessary to render it acid for the purpose of appropriate stability on storage, so that gelling out which might otherwise occur is reliably prevented.

What we claim is:

1. An auxiliary agent for improving the retention of flushable solids, for accelerating the drainage of suspensions and for rapid treatment of industrial waters, effluents and sludges by adding thereto basic water soluble polymer consisting essentially of a reaction product C formed by crosslinking 0.5 to 3 mols of an intermediate product A with 0.8 – 1.2 mols of an intermediate product B and 1–3 mols of a polyfunctional compound selected from the group consisting of epichlorohydrin and dihalogenoalkane, product A being at least one polyamine which contains quaternary nitrogen and formed at 40°–100° C by the action of 1–2 mols of a material selected from the group consisting of at least one polyvalent amine, at least one monovalent amine and mixture thereof with the reaction product of one mol of a secondary amine hydrochloride with 1 to 3 mols of epichlorohydrin, product B being at least one resinous, basic polyamino-amide formed from reacting materials selected from the group consisting of; at least one dicarboxylic acid and at least one polyalkylene polyamine; at least one aminocarboxylic acid and hexamethylenediammonium adipate; and at least one lactam and hexamethylene diammonium adipate.

2. An auxiliary agent according to claim 1 wherein product C is prepared by crosslinking 0.5 to 3 mols of product A, which is formed by the action of 1 to 2 mols of an alkalaine with the reaction product of 1 mol of a secondary amine hydrochloride of the general formula

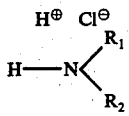

wherein
R$_1$ and R$_2$ are identical or different alkyl radicals of the general formula $C_xH_{2x+1}$ wherein $x$ is 1 to 4
with 1 to 3 mols of epichlorohydrin.

3. An auxiliary agent according to claim 1 wherein product C is prepared by crosslinking 0.8 to 1.2 mols of product A, which is formed by the action of 1.1 to 1.5 mols of an alkylamine selected from the group consisting of alkylamines of the general formula

R$_3$-NH$_2$; R$_3$—NH-R$_4$; NH$_2$—R$_5$-NH$_2$;

R$_3$—NH-R$_5$—NH-R$_4$;
H$_2$N-R$_5$-NH-R$_5$—(NH-R$_5$)$_n$—[NH$_2$]$_u$ wherein
R$_3$ R$_4$ and R$_5$ are each alkyl radicals of the formula $C_xH_{2x}$ and
$x$ is 2 to 4
$n$ is 0 to 3 and
$u$ is 0 or 1
on the reaction product of 1 mol of the secondary amine hydrochloride of the general formula

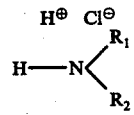

wherein
R$_1$ and R$_2$ are identical or different alkyl radicals of the general formula $C_xH_{2x+1}$ wherein $x$ is 1 or 2 with 1.5 mols of epichlorohydrin.

* * * * *